United States Patent [19]

Nakajima

[11] Patent Number: 6,061,465
[45] Date of Patent: *May 9, 2000

[54] RADIATION IMAGE PROCESSING METHOD AND APPARATUS

[75] Inventor: Nobuyoshi Nakajima, Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,325

[22] Filed: Aug. 29, 1997

[30] Foreign Application Priority Data

Aug. 29, 1996 [JP] Japan .................................. 8-228370

[51] Int. Cl.[7] .......................................................... G06K 9/00
[52] U.S. Cl. ................................................. 382/132; 378/902
[58] Field of Search ................................... 382/132, 282, 382/283; 378/902; 250/327.2, 484.1

[56] References Cited

U.S. PATENT DOCUMENTS

| 4,967,079 | 10/1990 | Shimura | 250/327.2 |
| 4,977,504 | 12/1990 | Funahashi | 382/132 |
| 5,313,726 | 5/1994 | Yaniv et al. | 40/361 |
| 5,319,719 | 6/1994 | Nakazawa et al. | 382/132 |
| 5,644,649 | 7/1997 | Schoeters et al. | 382/132 |
| 5,764,791 | 6/1998 | Hara | 382/132 |

FOREIGN PATENT DOCUMENTS 3-98174  4/1991  Japan .............................. G06F 15/68

*Primary Examiner*—Amelia Au
*Assistant Examiner*—Jingge Wu
*Attorney, Agent, or Firm*—Sughrue, Mion, Zinn, Macpeak & Seas, PLLC

[57] ABSTRACT

A radiation image signal, which has been obtained by reading out a radiation image having been recorded by use of an irradiation field stop and having an irradiation field thereon, is thinned out at a predetermined rate, and a thinned-out image signal is thereby obtained. The shape and location of the irradiation field are determined in accordance with the thinned-out image signal, and a range of a blackening process is set in accordance with the results of the determination. A blackening process is carried out on the thinned-out image signal with respect to the set blackening process range, and a visible image is reproduced from the thinned-out image signal., which has been obtained from the blackening process. The blackening process range is corrected in accordance with the visible image reproduced from the thinned-out image signal, which has been obtained from the blackening process. The blackening process is then carried out on the radiation image signal and in accordance with the set blackening process range or the corrected blackening process range.

12 Claims, 3 Drawing Sheets

RADIATION IMAGE PROCESSING METHOD AND APPARATUS

BACKGROUND OF THE INVENTION

1. Field of the Invention

This invention relates to a radiation image processing method and apparatus, in which a blackening process is carried out on a radiation image signal representing a radiation image, such that a region outside of an irradiation field on the radiation image may become darker than the region inside of the irradiation field. This invention particularly relates to an improvement in processing carried out in cases where the shape and location of the irradiation field were determined incorrectly.

2. Description of the Prior Art

Techniques for reading out a recorded radiation image in order to obtain an image signal, carrying out appropriate image processing on the image signal, and then reproducing a visible image having good image quality by use of the processed image signal have heretofore been known in various fields. For example, as such techniques, the applicant proposed various radiation image recording and reproducing systems which use stimulable phosphor sheets.

When a radiation image of an object, such as a living body, is recorded on a recording medium, such as X-ray film or a stimulable phosphor sheet, it is desirable that adverse effects of radiation upon the living body can be kept as small as possible. Also, if object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, an irradiation field stop is often used in order to limit the irradiation field to an area smaller than the overall recording region of the recording medium, such that radiation may be irradiated only to that portion of the object, the image of which is to be used.

In cases where a radiation image is recorded on a recording medium, such as a stimulable phosphor sheet, by using an irradiation field stop, an image of an object, or the like, is recorded in a region (i.e., an irradiation field) inward from the aperture contour of the irradiation field stop. Also, a region outward from the aperture contour of the irradiation field stop is not exposed to the radiation. Therefore, the aperture contour of the irradiation field stop constitutes an edge of the image.

In cases where an image signal is detected from the recording medium, on which an image has been recorded within only the irradiation field, and image processing is carried out on the image signal, the image processing, such as gradation processing, may be carried out on only the image signal components of the image signal, which correspond to the region inside of the irradiation field. In this manner, the amount of the processing can be reduced markedly, the load of the processing can be kept small, and the processing speed can be kept high.

The shape and location of the irradiation field can be determined automatically by, for example, utilizing the characteristics in that the aperture contour of the irradiation field stop constitutes the edge of the image and finding a portion, at which the value of the image signal changes sharply. Various techniques for determining the shape and location of the irradiation field have been proposed in, for example, U.S. Pat. No. 4,967,079.

An image signal, which has been obtained from the image processing, is fed into, for example, a display means, such as a cathode ray tube (CRT) display device, or a reproducing means, such as a laser printer, and used for reproducing a visible image.

However, in cases where the reproduced visible image is displayed on a CRT display device, the luminance of the region outside of the irradiation field becomes approximately highest on the visible image. Also, in cases where the visible image is reproduced on photographic film, the image density of the region outside of the irradiation field becomes approximately lowest on the visible image. Therefore, when the reproduced visible image is seen, strong light comes from the region outside of the irradiation field on the visible image and enters the eyes of the person, who sees the visible image. Accordingly, even if the image within the irradiation field has good image quality and can serve as an effective tool in, particularly, the efficient and accurate diagnosis of an illness, the reproduced visible image gives a glaring feeling to the person, who sees it, and becomes hard to see.

In order for the aforesaid problems to be eliminated, a process for blackening the region outside of the irradiation field has heretofore been carried out. With the blackening process, the image signal values corresponding to the region, which is outside of the irradiation field and to which no radiation impinged in the radiation image recording operation, and representing approximately the highest luminance or approximately the lowest image density are forcibly replaced by image signal values representing a low level of luminance or a high level of image density. In this manner, with the blackening process, the region outside of the irradiation field is rendered dark, such that the image within the irradiation field can be seen easily. The blackening process is proposed in, for example, Japanese Unexamined Patent Publication No. 3(1991)-98174.

However, the aforesaid processing for automatically determining the shape and location of the irradiation field cannot necessarily be carried out accurately. It often occurs that an area, which is larger or smaller than the area of the correct irradiation field, is determined as the irradiation field by mistake. If an area, which is larger than the area of the correct irradiation field, is determined as the irradiation field, a gap will occur between the correct irradiation field and the determined irradiation field, and the blackening process will not be carried out with respect to the gap. In such cases, substantially the same problems will occur as those occurring when the blackening process is not employed. If an area, which is smaller than the area of the correct irradiation field, is determined as the irradiation field, a portion of the correct irradiation field will be subjected to the blackening process. It will often occur that a portion of the object image, which is necessary for a diagnosis, or the like, is located at the thus blackened portion of the irradiation field. In such cases, it becomes necessary to again carry out the operation for recording the radiation image.

SUMMARY OF THE INVENTION

The primary object of the present invention is to provide a radiation image processing method, wherein a reproduced visible image is prevented from glaring, wherein a radiation image recording operation need not be carried out again when processing for automatically determining the shape and location of an irradiation field was not carried out accurately, and wherein a load of processing for determining the shape and location of an irradiation field is kept small.

Another object of the present invention is to provide an apparatus for carrying out the radiation image processing method.

The objects are accomplished by a radiation image processing method and apparatus in accordance with the present invention, wherein an original image signal is thinned out, a thinned-out image signal is thereby formed, a blackening process is carried out automatically on the thinned-out image signal, and the results of the blackening process are monitored. In cases where the range of the blackening process is correct, a blackening process is carried out on the original image signal with respect to the blackening process range. In cases where the range of the blackening process is not correct, the range of the blackening process is manually corrected and set, and a blackening process is carried out on the original image signal with respect to the corrected blackening process range. Also, automatic finding of the range of the blackening process is carried out on the thinned-out image signal, and the load of the processing is thereby kept small.

Specifically, the present invention provides a radiation image processing method, in which desired image processing is carried out on a radiation image signal obtained by reading out a radiation image having been recorded by use of an irradiation field stop and having an irradiation field thereon, an image signal obtained from the desired image processing being used for reproducing a visible radiation image on a predetermined image reproducing medium, the method comprising: detecting the shape and location of the irradiation field on the radiation image in accordance with the radiation image signal, and carrying out a blackening process on the radiation image signal corresponding to a region outside of the irradiation field, wherein the improvement comprises the steps of:

i) thinning out image signal components of the radiation image signal at a predetermined rate, a thinned-out image signal being thereby obtained, ii) determining the shape and location of the irradiation field in accordance with the thinned-out image signal, iii) setting a range of the blackening process in accordance with the results of the determination, iv) carrying out a blackening process on the thinned-out image signal with respect to the set blackening process range, v) reproducing a visible image from the thinned-out image signal, which has been obtained from the blackening process, vi) correcting the blackening process range in accordance with the visible image reproduced from the thinned-out image signal, which has been obtained from the blackening process, and vii) carrying out the blackening process on the radiation image signal and in accordance with the set blackening process range or the corrected blackening process range.

With the blackening process, the image signal values corresponding to the region outside of the irradiation field are forcibly replaced by image signal values such that the luminance on the reproduced visible image may become approximately equal to the lowest value (in cases where the visible image is reproduced by a reproducing means, such as a CRT display device, which expresses the gray level of the image by the luminance), or such that the image density on the reproduced visible image may become approximately equal to the highest value (in cases were the visible image is reproduced by a reproducing means, such as a laser printer, which expresses the gray level of the image by the image density). In this manner, with the blackening process, the region outside of the irradiation field is forcibly rendered dark, such that the glare-preventing effects can be obtained and the image within the irradiation field can be seen easily.

However, the blackening process is not limited to the process, in which the image signal values are replaced such that the luminance may become approximately equal to the lowest value, or such that the image density may become approximately equal to the highest value. For example, the blackening process may be carried out such that the region outside of the irradiation field may be perceived to be as dark as the object image within the irradiation field or to be darker than the object image within the irradiation field. Also, as the process for forcibly replacing the image signal values, a process may be carried out, wherein a predetermined value is subtracted from the image signal values (in the cases of the luminance), or wherein a predetermined value is added to the image signal values (in the cases of the image density). In cases where the process for adding or subtracting a predetermined value is employed, even if an area, which is smaller than the area of the correct irradiation field, is determined as the irradiation field by mistake, and a portion of the correct irradiation field is subjected to the blackening process, a difference in luminance or image density between the object image portion, which has been rendered dark by mistake, and the portion, in which no object image is located, can be perceived in the region having been subjected to the blackening process by mistake. Therefore, it can be found easily that the shape and location of the irradiation field were determined incorrectly.

In the radiation image processing method in accordance with the present invention (and in a radiation image processing apparatus in accordance with the present invention, which will be described later), the blackening process carried out on the radiation image signal (i.e., the original image signal) and the blackening process carried out on the thinned-out image signal need not necessarily be identical with each other. As the blackening process carried out on the original image signal representing the original image to be used, a blackening process should preferably be employed, in which the image signal values of the original image signal are replaced by an image signal value representing the highest image density or the lowest luminance, such that the object image may look well. Also, as the blackening process carried out on the thinned-out image signal, a blackening process should preferably be employed, in which a predetermined value is added to or subtracted from the image signal values of the thinned-out image signal, such that a judgment can be made as to whether the blackening process range having been set is or is not appropriate.

Further, the term "correcting a blackening process range in accordance with a visible image reproduced from a thinned-out image signal" as used herein embraces, in its scope, the cases wherein the correction is not carried out substantially. This is because, in cases where the determination of the shape and location of the irradiation field was carried out correctly, it is not necessary to carry out a manual correction.

The term "carrying out a blackening process on a radiation image signal and in accordance with a set blackening process range or a corrected blackening process range, as used herein means that, in cases where no correction was made on the blackening process range, the blackening process is carried out in accordance with the set blackening process range and that, in cases where a correction was made on the blackening process range, the blackening process is carried out in accordance with the corrected blackening process range.

The present invention also provides a radiation image processing apparatus, in which desired image processing is carried out on a radiation image signal obtained by reading out a radiation image having been recorded by use of an irradiation field stop and having an irradiation field thereon, an image signal obtained from the desired image processing being used for reproducing a visible radiation image on a predetermined image reproducing medium, the apparatus detecting the shape and location of the irradiation field on the radiation image in accordance with the radiation image signal, and carrying out a blackening process on the radiation image signal corresponding to a region outside of the irradiation field, wherein the improvement comprises the provision of:

i) a radiation image signal storing means for storing the radiation image signal, ii) a thinned-out image signal forming means for thinning out image signal components of the radiation image signal at a predetermined rate and thereby obtaining a thinned-out image signal, iii) a blackening process range setting means for determining the shape and location of the irradiation field in accordance with the thinned-out image signal and setting a range of the blackening process in accordance with the results of the determination, iv) a thinned-out image blackening process means for carrying out a blackening process on the thinned-out image signal with respect to the set blackening process range, v) a thinned-out image reproducing medium for reproducing a visible image from the thinned-out image signal, which has been obtained from the blackening process, vi) a blackening process range correcting means for correcting the blackening process range, and vii) a radiation image blackening process means for carrying out the blackening process on the radiation image signal, which is received from the radiation image signal storing means, and in accordance with the blackening process range, which has been set by the blackening process range setting means, or the blackening process range, which has been corrected by the blackening process range correcting means.

With the radiation image processing method and apparatus in accordance with the present invention, the original image signal is thinned out, and the thinned-out image signal is thereby formed. The blackening process is carried out automatically on the thinned-out image signal, and the results of the blackening process are monitored. In cases where the range of the blackening process is correct, the blackening process is carried out on the original image signal with respect to the blackening process range. In cases where the range of the blackening process is not correct, the range of the blackening process is manually corrected and set, and the blackening process is carried out on the original image signal with respect to the corrected blackening process range.

Therefore, with the radiation image processing method and apparatus in accordance with the present invention, in cases where the blackening process range having been set automatically in accordance with the thinned-out image is not correct, the range of the blackening process can be corrected manually while the thinned-out image is being monitored. Accordingly, the blackening process on the original image signal can be carried out with respect to the correct blackening process range. In this manner, the reproduced visible image can be prevented from glaring.

Further, the image signal, which is utilized for monitoring, for setting the blackening process range, and for carrying out the blackening process, is the thinned-out image signal, which is obtained by thinning out the original image signal. The thinned-out image signal is made up of a smaller number of image signal components than that of the image signal components of the original image signal. Therefore, the load of the processing can be kept small.

DESCRIPTION OF THE PREFERRED EMBODIMENTS

The present invention will hereinbelow be described in further detail with reference to the accompanying drawings.

Figure 1:
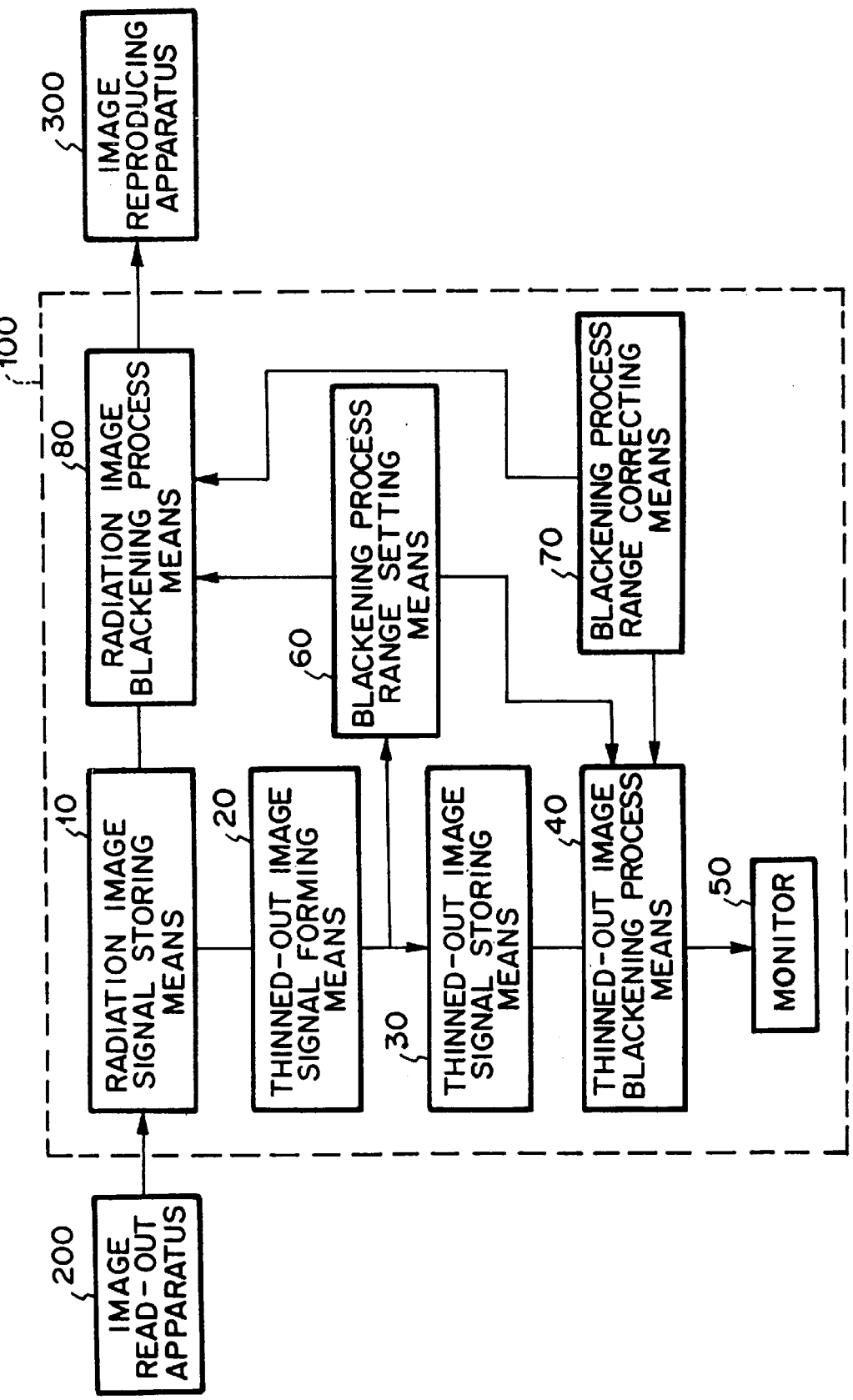
FIG. 1 is a block diagram showing an embodiment of the radiation image processing apparatus in accordance with the present invention.

FIG. 1 shows a radiation image processing apparatus 100, which is an embodiment of the radiation image processing apparatus in accordance with the present invention.

Figure 2:
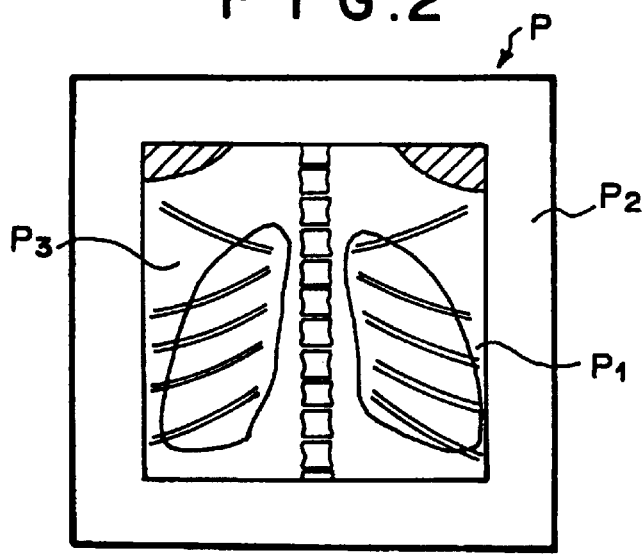
FIG. 2 is an explanatory view showing a radiation image, which is processed by the embodiment of FIG. 1.

As illustrated in FIG. 2, in the radiation image processing apparatus 100, a radiation image P is processed, which has been recorded by using a predetermined irradiation field stop and has an irradiation field P1 thereon. A region P2, upon which no radiation impinged in an operation for recording the radiation image P, is located on the side outward from the irradiation field P1. An object image P3 has been recorded within the irradiation field P1 on the radiation image P.

The radiation image processing apparatus 100 receives a radiation image signal S, which has been obtained by reading out the radiation image P shown in FIG. 2 with an image read-out apparatus 200. The radiation image processing apparatus 100 carries out a blackening process on the radiation image signal S with respect to the region P2 outside of the irradiation field and feeds an image signal, which has been obtained from the blackening process, into an image reproducing apparatus 300.

The radiation image processing apparatus 100 comprises a radiation image signal storing means 10 for storing the radiation image signal S, and a thinned-out image signal forming means 20 for thinning out image signal components of the radiation image signal S at a predetermined rate and thereby obtaining a thinned-out image signal S'. The radiation image processing apparatus 100 also comprises a thinned-out image signal storing means 30 for storing the thinned-out image signal S', and a blackening process range setting means 60 for determining the shape and location of the irradiation field P1 in accordance with the thinned-out image signal S' and setting a range of the blackening process, which is to be carried out on the radiation image signal S, in accordance with the results of the determination. The radiation image processing apparatus 100 further comprises a thinned-out image blackening process means 40 for carrying out a blackening process on the thinned-out image signal S' with respect to the set blackening process range, and a monitor 50 for reproducing a visible image P1 from the thinned-out image signal S', which has been obtained from the blackening process. The radiation image processing apparatus 100 still further comprises a blackening process range correcting means 70 for manually correcting the blackening process range, and a radiation image blackening process means 80 for carrying out the blackening process on the radiation image signal S, which is received from the radiation image signal storing means 10, and in accordance with the blackening process range, which has been set by the blackening process range setting means 60, or the blackening process range, which has been corrected by the blackening process range correcting means 70.

By way of example, the radiation image signal (i.e., the original image signal) S maybe made up of a series of image signal components representing an array of 2,000 picture elements×2,000 picture elements. In such cases, the thinned-out image signal forming means 20 thins out the image signal components at a rate of nine picture elements per ten picture elements along each row and each column in the array of the picture elements and thereby forms the thinned-out image signal S', which is made up of a series of image signal components representing an array of 200 picture elements×200 picture elements.

Also, by way of example, each of the radiation image signal S and the thinned-out image signal S' may be the signal (0, 1, . . . , 1,023) expressed with 10 bits, and the image signal value corresponding to the highest image density on a reproduced visible image may be equal to 1,023. In such cases, as the blackening process carried out by the thinned-out image blackening process means 40 and the blackening process carried out by the radiation image blackening process means 80, for example, a process may be employed in which the image signal values subjected to the process may be forcibly replaced by a value of 1,023.

In the blackening process range setting means 60, in order for the shape and location of the irradiation field P1 to be determined, by way of example, the technique described below may be utilized.

Figure 3:
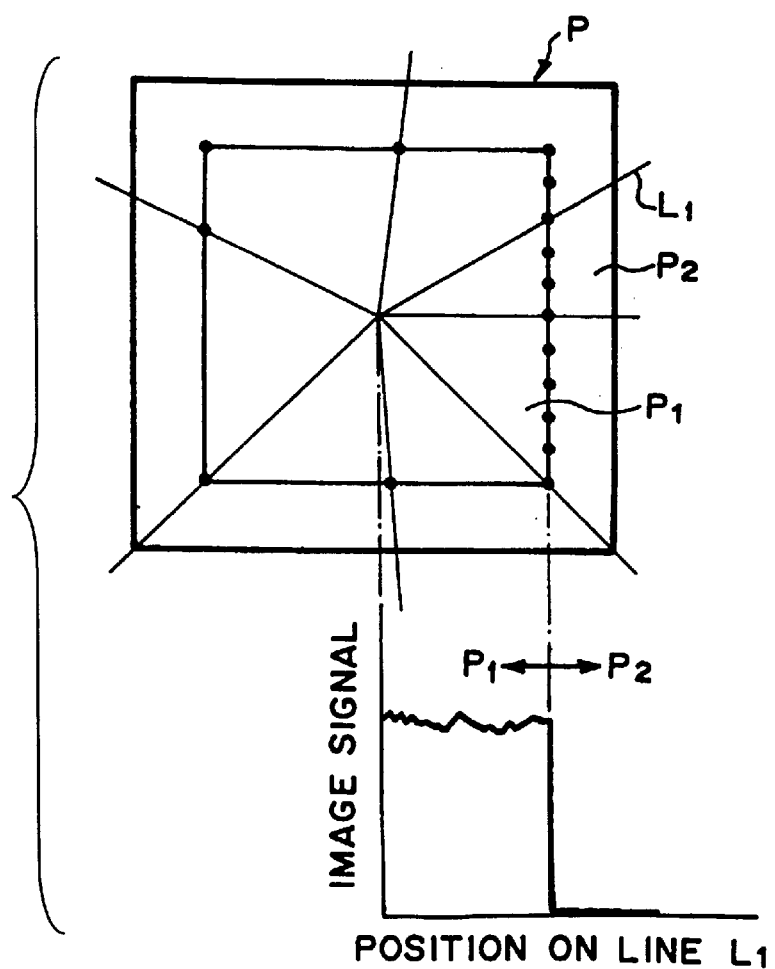
FIG. 3 is an explanatory view showing an example of how the shape and location of an irradiation field P1 are determined.

Specifically, as illustrated in FIG. 3, a plurality of straight lines are drawn radially from the center point of the image P, and image signal values corresponding to positions on each straight line are detected. A position, at which the image signal value sharply changes to a value of approximately zero, is taken as a boundary point between the irradiation field P1 and the region P2 outside of the irradiation field. The boundary points, which have thus been detected on the radial straight lines, are connected with one another, and boundary lines are thereby determined. It is determined that the region inward from the boundary lines is the irradiation field P1, and the region outward from the boundary lines is the region P2 outside of the irradiation field.

The blackening process range, which is set by the blackening process range setting means 60, coincides with the area of the region P2 outside of the irradiation field, which is determined in the manner described above.

How the radiation image processing apparatus 100 operates will be described hereinbelow.

The radiation image signal S, which may be made up of a series of image signal components representing, for example, an array of 2,000 picture elements×2,000 picture elements, is fed from the image read-out apparatus 200 into the radiation image signal storing means 10 of the radiation image processing apparatus 100 and stored in the radiation image signal storing means 10.

Thereafter, the thinned-out image signal forming means 20 reads the radiation image signal S from the radiation image signal storing means 10 and thins out the image signal components of the radiation image signal S at a rate of nine picture elements per ten picture elements along each row and each column in the array of the picture elements. In this manner, the thinned-out image signal S', which is made up of a series of image signal components representing an array of 200 picture elements×200 picture elements, is formed.

The thinned-out image signal S' is fed into the blackening process range setting means 60 and the thinned-out image signal storing means 30. In the manner described above, the blackening process range setting means 60 carries out the determination of the shape and location of the irradiation field P1 and the setting of the blackening process range in accordance with the thinned-out image signal S'. Specifically, the region P2 outside of the irradiation field is set as the blackening process range.

Information representing the blackening process range, which has been set by the blackening process range setting means 60, is fed into the thinned-out image blackening process means 40 and the radiation image blackening process means 80.

Thereafter, the thinned-out image blackening process means 40 reads the thinned-out image signal S' from the thinned-out image signal storing means 30 and carries out the blackening process on the thinned-out image signal S' with respect to the blackening process range, which has been set by the blackening process range setting means 60. The thinned-out image signal S', which has been obtained from the blackening process, is fed into the monitor 50. The visible image (the thinned-out image) P' is reproduced from the thinned-out image signal S', which has been obtained from the blackening process, and is displayed on the display screen of the monitor 50.

A person, such as a medical doctor or a radiation engineer, sees the thinned-out image P1 displayed on the monitor 50 and makes a judgment as to whether the range, over which the blackening process has been carried out, is or is not correct. Specifically, the person, who sees the thinned-out image P', judges whether or not a portion of the object image P3 to be used has been blackened by mistake, or whether or not the entire area of the region P2 outside of the irradiation field, which region is to be blackened, has been blackened.

Figure 4A:
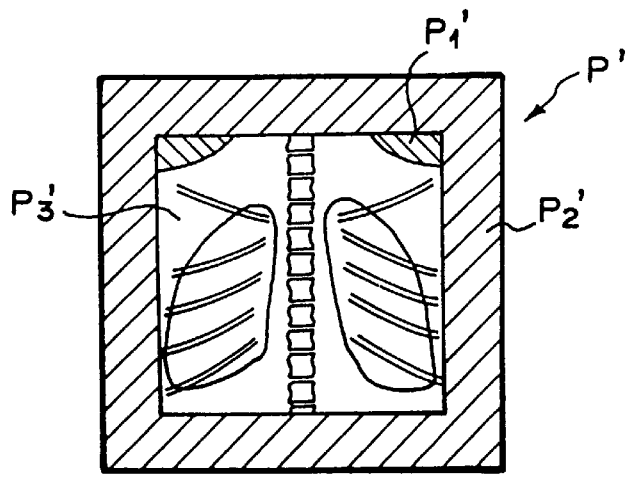
FIG. 4A is an explanatory view showing a thinned-out image P', which is displayed on a monitor 50 and on which a blackening process has been carried out with respect to an appropriate blackening process range.

As illustrated in FIG. 4A, in cases where it has been judged from the thinned-out image P', which is displayed on the monitor 50, that the blackening process has been carried out with respect to the appropriate blackening process range, information representing that no correction need be carried out is entered by the person, who sees the thinned-out image P', into the blackening process range correcting means 70. In such cases, the blackening process range correcting means 70 feeds the information, which represents a value of zero as the amount of correction of the blackening process range having already been set by the blackening process range setting means 60, into the radiation image blackening process means 80.

The radiation image blackening process means 80 receives the information, which represents a value zero as the amount of correction, and reads the radiation image signal S from the radiation image signal storing means 10. Also, the radiation image blackening process means 80 carries out the blackening process on the radiation image signal S and in accordance with the blackening process range, which has been set by the blackening process range setting means 60.

The radiation image signal S, which has been obtained from the blackening process carried out by the radiation image blackening process means 80, is fed into the image reproducing apparatus 300. In the image reproducing apparatus 300, a visible image P is reproduced from the radiation image signal S and displayed.

The visible image P, which is displayed on the image reproducing apparatus 300, has a finer resolution than the visible image P', which is displayed on the monitor 50. However, basically, the visible image P and the visible image P' represent the same object image information. Therefore, if the blackening process range on the visible image P', which is displayed on the monitor 50, is appropriate, the blackening process range on the visible image P, which is displayed on the image reproducing apparatus 300, will also be appropriate.

Figure 4B:
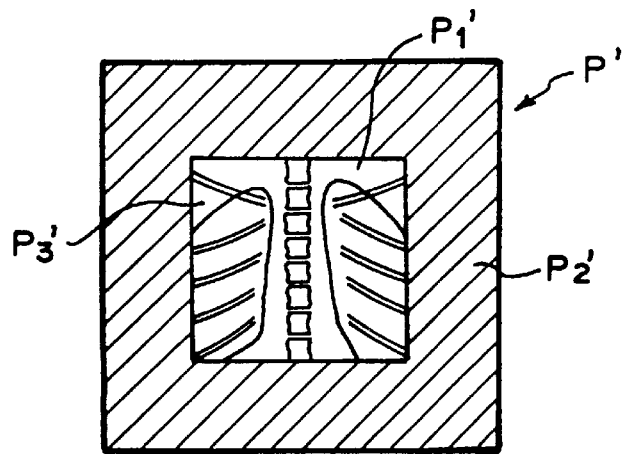
FIG. 4B is an explanatory view showing a thinned-out image P', which is displayed on the monitor 50 and on which the blackening process has been carried out with respect to an inappropriate blackening process range that extends to a portion of an object image to be used.
Figure 4C:
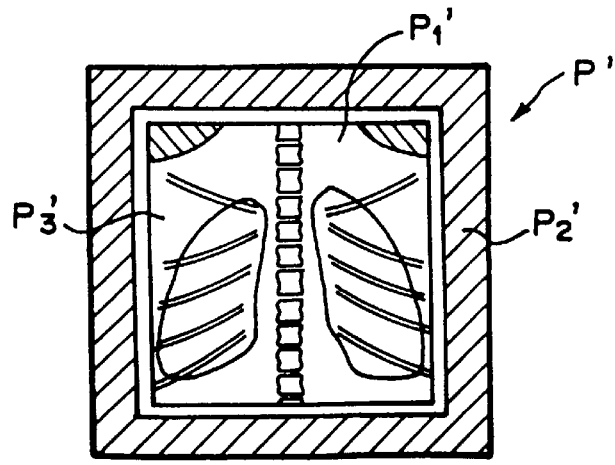
FIG. 4C is an explanatory view showing a thinned-out image P', which is displayed on the monitor 50 and on which the blackening process has been carried out with respect to an inappropriate blackening process range that does not cover an entire area of a region outside of an irradiation field.

FIG. 4B shows the thinned-out image P', which is displayed on the monitor 50 and on which the blackening process has been carried out with respect to an inappropriate blackening process range that extends to a portion of the object image (P3') to be used. Also, FIG. 4C shows the thinned-out image P', which is displayed on the monitor 50 and on which the blackening process has been carried out with respect to an inappropriate blackening process range that does not cover the entire area of the region P2' outside of the irradiation field. In the cases of FIG. 4B or FIG. 4C, the person, who sees the thinned-out image P' displayed on the monitor 50, enters information, which represents an amount of correction of the blackening process range, into the blackening process range correcting means 70.

In order for the information representing the amount of correction to be entered, for example, a new blackening process range after being corrected may be specified on the monitor 50 by using a position specifying means, such as cursor keys or a mouse device. Alternatively, the information representing the amount, by which the blackening process range is to be corrected, may be entered from a keyboard.

The information representing the amount of correction of the blackening process range, which information has been fed into the blackening process range correcting means 70, is then fed from the blackening process range correcting means 70 into the thinned-out image blackening process means 40. The thinned-out image blackening process means 40 carries out the blackening process on the thinned-out image signal S', which is received from the thinned-out image signal storing means 30, and in accordance with the specified new blackening process range or in accordance with the blackening process range having been set previously and the specified correction amount. The thinned-out image signal S', which has thus been obtained from the blackening process, is fed into the monitor 50 and used for reproducing and displaying a visible image (the thinned-out image) P' on the display screen of the monitor 50.

Thereafter, in cases where it has been judged from the thinned-out image P', which is displayed on the monitor 50, that the blackening process has been carried out with respect to the appropriate blackening process range, the radiation image blackening process means 80 carries out the blackening process on the radiation image signal S, which is received from the radiation image signal storing means 10, and in accordance with the specified new blackening process range or in accordance with the blackening process range having been set previously and the specified correction amount.

The radiation image signal S, which has been obtained from the blackening process carried out by the radiation image blackening process means 80, is fed into the image reproducing apparatus 300. In the image reproducing apparatus 300, the visible image P is reproduced from the radiation image signal S and displayed. In this case, the blackening process range on the visible image P', which is displayed on the monitor 50, is appropriate, and therefore the blackening process range on the visible image P, which is displayed on the image reproducing apparatus 300, is also appropriate.

As described above, with this embodiment, in cases where the blackening process range having been set automatically in accordance with the thinned-out image is not correct, the range of the blackening process can be corrected manually while the thinned-out image is being monitored. Accordingly, the blackening process on the radiation image signal can be carried out with respect to the correct blackening process range. In this manner, the reproduced visible image can be prevented from glaring. Also, the object image information to be used can be prevented from being lost.

Further, the image signal, which is utilized for monitoring, for setting the blackening process range, and for carrying out the blackening process, is the thinned-out image signal. Therefore, the load of the processing for the monitoring, for the setting the blackening process range, and for the blackening process, can be kept small.

In the radiation image processing apparatus 100, only the appropriate blackening process is carried out. However, in the radiation image processing method and apparatus in accordance with the present invention, after the blackening process has been carried out, various kinds of image processing, such as gradation processing, frequency processing, and image size enlargement processing, may be carried out.

Specifically, in the radiation image processing method and apparatus in accordance with the present invention, the processing for determining the shape and location of the irradiation field is carried out such that the blackening process can then be carried out. Further, after the shape and location of the irradiation field have been determined, the portion of the image signal corresponding to the unnecessary image portion (i.e., the region outside of the irradiation field) may be eliminated, and various kinds of image processing described above may be carried out on only the image signal corresponding to the region inside of the irradiation field. In this manner, appropriate image processing can be carried out on the object image to be used, which is located in the region inside of the irradiation field.

In cases where the image processing described above is carried out, normalizing processing (i.e., exposure data recognizer processing, also referred to as EDR processing) should preferably be carried out on the image signal corresponding to the region inside of the irradiation field.

The normalizing processing has been proposed by the applicant in, for example, Japanese Patent Publication No. 4(1992)-64223. With the normalizing processing, when the conditions, under which the image processing is to be carried out on a radiation image, are determined, a histogram of the image signal is analyzed, and the image signal is converted into an image signal, which represents image density and gradation suitable for the characteristics of an image reproducing means or an image reproducing medium, in accordance with the results of the analysis of the histogram.

What is claimed is:

1. A radiation image processing method, in which desired image processing is carried out on a radiation image signal obtained by reading out a radiation image having been recorded by use of an irradiation field stop and having an irradiation field thereon, an image signal obtained from the desired image processing being used for reproducing a visible radiation image on a predetermined image reproducing medium, the method comprising: detecting the shape and location of the irradiation field on the radiation image in accordance with the radiation image signal, and carrying out a blackening process on the radiation image signal corresponding to a region outside of the irradiation field, wherein the improvement comprises the steps of:

i) thinning out image signal components of the radiation image signal at a predetermined rate, a thinned-out image signal being thereby obtained, ii) automatically determining the shape and location of the irradiation field in accordance with said thinned-out image signal, iii) setting a range of the blackening process in accordance with the results of said determination, iv) carrying out a blackening process on said thinned-out image signal with respect to said set blackening process range, v) reproducing a visible image from the thinned-out image signal, which has been obtained from the blackening process, vi) correcting manually said blackening process range in accordance with the visible image reproduced from said thinned-out image signal, which has been obtained from the blackening process, and vii) carrying out the blackening process on the radiation image signal and in accordance with said set blackening process range or said corrected blackening process range.

2. A method as defined in claim 1 wherein the blackening process carried out on the radiation image signal is a process, in which the image signal values of the radiation image signal are replaced by an image signal value representing the highest image density or the lowest luminance.

3. A method as defined in claim 1 wherein the blackening process carried out on said thinned-out image signal is a process, in which a predetermined value is added to or subtracted from the image signal values of said thinned-out image signal.

4. A radiation image processing apparatus, in which desired image processing is carried out on a radiation image signal obtained by reading out a radiation image having been recorded by use of an irradiation field stop and having an irradiation field thereon, an image signal obtained from the desired image processing being used for reproducing a visible radiation image on a predetermined image reproducing medium, the apparatus detecting the shape and location of the irradiation field on the radiation image in accordance with the radiation image signal, and carrying out a blackening process on the radiation image signal corresponding to a region outside of the irradiation field, wherein the improvement comprises the provision of:

i) a radiation image signal storing means for storing the radiation image signal, ii) a thinned-out image signal forming means for thinning out image signal components of the radiation image signal at a predetermined rate and thereby obtaining a thinned-out image signal, iii) a blackening process range setting means for automatically determining the shape and location of the irradiation field in accordance with said thinned-out image signal and setting a range of the blackening process in accordance with the results of said determination, iv) a thinned-out image blackening process means for carrying out a blackening process on said thinned-out image signal with respect to said set blackening process range, v) a thinned-out image reproducing medium for reproducing a visible image from the thinned-out image signal, which has been obtained from the blackening process, vi) a blackening process range correcting means for correcting manually said blackening process range, and vii) a radiation image blackening process means for carrying out the blackening process on the radiation image signal, which is received from said radiation image signal storing means, and in accordance with said blackening process range, which has been set by said blackening process range setting means, or said blackening process range, which has been corrected by said blackening process range correcting means.

5. An apparatus as defined in claim 4 wherein the blackening process carried out on the radiation image signal is a process, in which the image signal values of the radiation image signal are replaced by an image signal value representing the highest image density or the lowest luminance.

6. An apparatus as defined in claim 4 wherein the blackening process carried out on said thinned-out image signal is a process, in which a predetermined value is added to or subtracted from the image signal values of said thinned-out image signal.

7. The method of claim 1, wherein in said step ii) said irradiation field is determined by detecting a predetermined change in said radiation image signal.

8. The method of claim 1, wherein said step ii) comprises sub-steps of:

a) drawing a plurality of straight lines radially from a center point of said image, b) detecting values of said thinned-out image signal along each of said plurality of straight lines, c) detecting a plurality of boundary points of said irradiation field based on a predetermined change in said values of said thinned out image signal, d) using said plurality of detected boundary points to define a boundary of said irradiation field.

9. The apparatus of claim 4, wherein in said blackening process range setting means automatically determines the shape and location of the irradiation field by detecting a predetermined change in said radiation image signal.

10. The apparatus of claim 4, wherein said blackening process range setting means automatically determines the shape and location of the irradiation field by:

e) drawing a plurality of straight lines radially from a center point of said image, f) detecting values of said thinned-out image signal along each of said plurality of straight lines, g) detecting a plurality of boundary points of said irradiation field based on a predetermined change in said values of said thinned out image signal, h) using said plurality of detected boundary points to define a boundary of said irradiation field.

11. The method of claim 1, wherein in said step ii) the shape and location of said irradiation field is automatically determined in accordance with said thinned-out image signal, based upon exposure of said irradiation field to a penetrating radiation.

12. The apparatus of claim 4, wherein said blackening process range setting means automatically determines the shape and location of said irradiation field in accordance with said thinned-out image signal based upon exposure of said irradiation field to a penetrating radiation.

* * * * *